United States Patent [19] [11] 4,231,474
Takahashi [45] Nov. 4, 1980

[54] STORAGE CASE
[75] Inventor: Kenji Takahashi, Tagajo, Japan
[73] Assignee: Sony Corporation, Tokyo, Japan
[21] Appl. No.: 26,311
[22] Filed: Apr. 2, 1979
[30] Foreign Application Priority Data
Apr. 7, 1978 [JP] Japan .............................. 53/46334[U]
Apr. 11, 1978 [JP] Japan .............................. 53/47355[U]
[51] Int. Cl.³ .............................................. B65D 85/67
[52] U.S. Cl. ............................... 206/387; 206/493;
220/306; 220/337; 220/339; 242/200
[58] Field of Search ............... 206/387, 306, 305, 304,
206/303, 444, 493; 220/337, 339, 353, 306;
242/200

[56] References Cited
U.S. PATENT DOCUMENTS

| D. 213,157 | 1/1969 | Wallace ........................... 206/387 X |
| 915,845 | 3/1909 | Freeborn ............................... 220/268 |
| 3,424,341 | 1/1969 | Slapnik ................................ D9/240 X |
| 3,489,273 | 1/1970 | McKelvey, Jr. ...................... 206/406 |
| 3,512,698 | 5/1970 | Kapustka ........................... 220/339 X |
| 3,579,883 | 5/1971 | Hayes ................................. 220/339 X |
| 3,741,377 | 6/1973 | Krellen ............................... 220/339 X |
| 3,876,071 | 4/1975 | Neal et al. ........................... 206/387 |
| 4,011,940 | 3/1977 | Neal et al. ............................ 206/1.5 |
| 4,054,206 | 10/1977 | Kobayashi et al. .................. 206/387 |

FOREIGN PATENT DOCUMENTS 1255009 11/1971 United Kingdom ..................... 206/406

Primary Examiner—Allan N. Shoap
Attorney, Agent, or Firm—Lewis H. Eslinger; Alvin Sinderbrand

[57] ABSTRACT

A storage case, adapted to store a cassette of the type having at least one reel, is formed of walls which are closable to form the storage case. At least one hub engaging member is mounted on a wall for engaging the hub of the reel when the cassette is placed into the storage case. The hub engaging member includes a post extending from the wall and having a longitudinal slit therein parallel to the longitudinal axis of the post so as to form two compressible post portions, each portion having a finger projecting outward therefrom. A coil spring is positioned over and guided by the post, and a cap having a cylindrical wall, a top wall and an annular shoulder is positioned over the post. When assembling the cap to the post, the annular shoulder of the cap compresses the post portions to permit the fingers to pass through the annular shoulder and then to expand and lockingly engage the shoulder. The spring exerts an upward bias force on the cap. At least one projection is provided on the top wall of the cap to engage the hub. Locking means prevents the cap from rotating. The storage case also includes a novel releasable locking assembly, an improved hinge to facilitate the opening and closing of the case and a reinforcing member so as to prevent unwanted deflections of the side, or peripheral walls, of the case.

17 Claims, 17 Drawing Figures

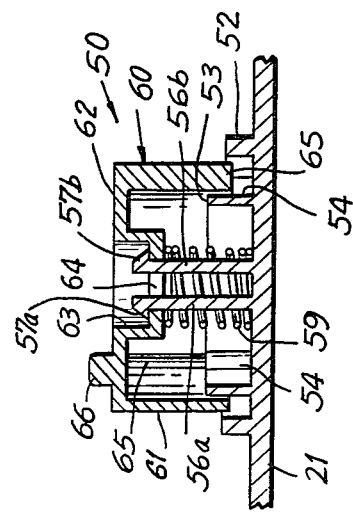
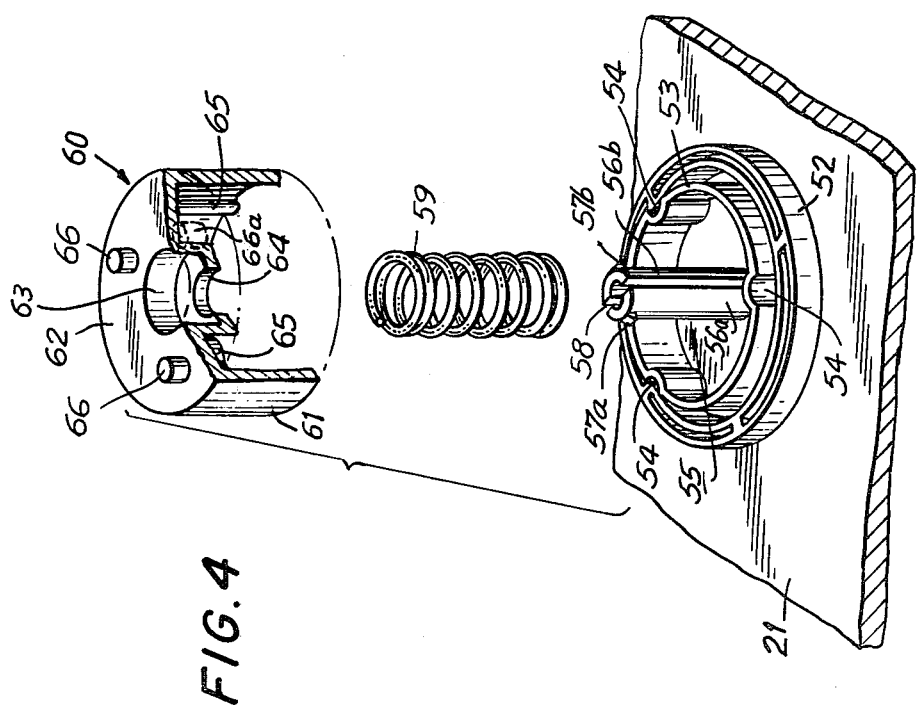

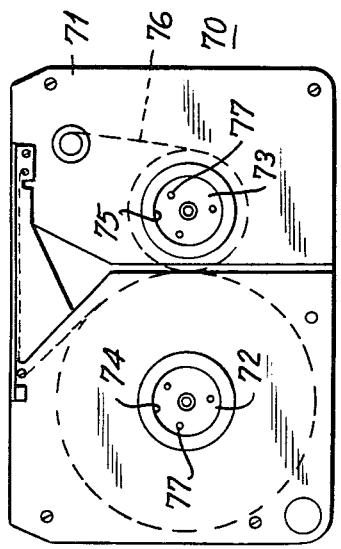
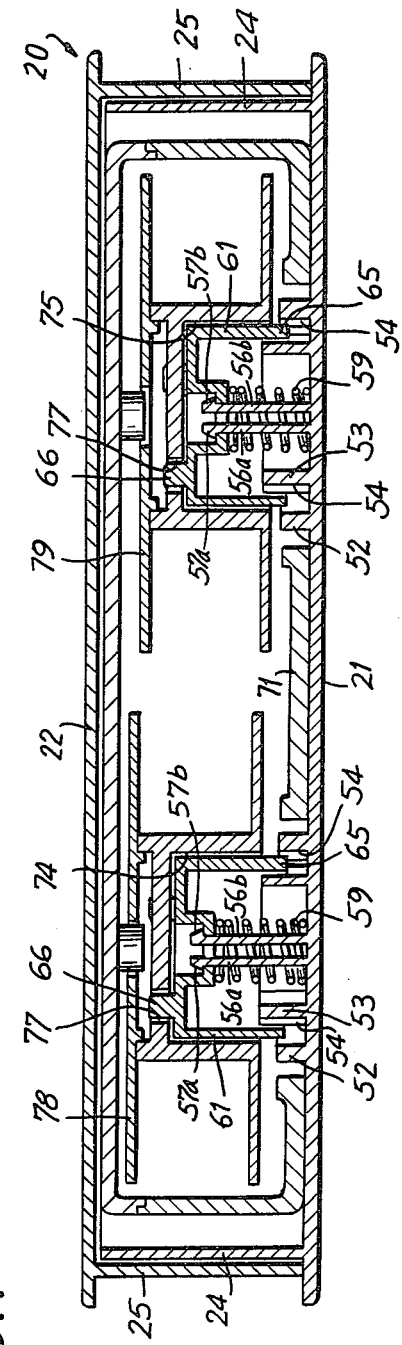
FIG. 6
FIG. 7

STORAGE CASE

BACKGROUND OF THE INVENTION

This invention relates to a storage case and, more particularly, to such a case which is readily adapted to store a cassette therein, and to prevent unwanted rotation of the cassette reels so as to avoid unwinding of the medium which is wound upon such reels.

Storage cases which are particularly adapted to store a cassette therein, such as a magnetic tape cassette, wherein the tape reels are prevented from unwinding are known to the prior art. One example of such a storage case is described in U.S. Pat. No. 4,054,206, assigned to the assignee of the present invention. As disclosed in that patent, the storage case includes a pair of hub engaging members secured to, for example, the bottom wall of the case and extending in an upward direction. Each engaging member is positioned such that when a cassette is placed within the case, the engaging member is inserted into the hub of a respective tape reel; and protuberances, or buttons, which extend upward from the top of the engaging member are inserted into corresponding drive holes in the reel hub. The engaging member is locked from rotating and, therefore, prevents the reel from rotating, thereby avoiding undesired tape spillage which otherwise might occur if the reel is free to rotate during handling of the stored cassette. The hub engaging member of the just-described storage case includes a spring which biases a cap bearing the protuberances in the upward direction. However, because of the particular construction of the hub engaging member, assembly thereof is carried out by hand. Furthermore, a significant number of elements must be formed and assembled to constitute this hub engaging member.

It is one advantageous feature of the present invention to simplify the construction of the hub engaging member described in U.S. Pat. No. 4,054,206, and to permit the manufacture and assembly of the hub engaging member substantially totally by automation.

Other examples of storage cases which are adapted to store magnetic tape cassettes therein are described in U.S. Pat. Nos. 3,876,071 and 4,011,940. These storage cases also are provided with hub engaging members which serve to lock the tape reels from undesired rotation. In all of these storage cases, plastic material generally is used so as to form the case of, substantially, unitary construction. In order to protect the cassette and tape therein from contamination by dust, the storage case, when closed, is formed of top and bottom walls, as well as a peripheral wall. It is advantageous to join the top and bottom walls with an end wall which is hingedly connected to each of the top and bottom walls. One difficulty, when constructing a storage case in this manner, is that related to the hinges between the end wall and the top and bottom walls. Such hinges generally are formed of the same plastic material as the remainder of the case, but the plastic material is made much thinner than the walls which is joins. This presents a problem in strength over a period of time. If the hinge portion of the plastic material is made thicker, there is difficulty in opening and closing the case. This is particularly disadvantageous if automatic equipment is used to insert a cassette into the case. That is, an incomplete opening of the case because of the thickened hinge portions may interfere with insertion of the cassette therein.

In accordance with another advantageous feature of the present invention, a storage case is provided with improved hinge elements for hingedly joining an end wall to each of top and bottom walls, whereby the opening and closing of the case is facilitated without sacrificing strength.

In the storage case described in U.S. Pat. No. 4,011,940, releasable locking elements are provided in order to maintain the closure of the storage case. Such locking elements are constituted by a pair of straps secured to the front edge of, for example, the bottom wall, each strap being provided with a button for insertion into an aperture which is provided along the front portion of a peripheral wall which extends downwardly from the top wall. This arrangement of releasable locking members requires the separate alignment and insertion of each button into its corresponding aperture. Such maneuvering may be inconvenient, especially if the user can devote only one hand to the opening of the case.

In accordance with yet another advantageous feature of the present invention, an improved releasable locking arrangement is provided whereby the storage case automatically is locked once it is closed, without requiring any further effort by the user to lock the case. Furthermore, the locked case can be opened easily and conveniently by the user.

When the storage case described in U.S. Pat. No. 4,011,940 is in its closed condition, there is the possibility that, in the absence of any additional retaining members, the side peripheral wall may not fit flush against the end wall. Consequently, a gap therebetween may be formed which permits the entry of dust or other contaminating particles.

In accordance with yet another advantageous feature of the present invention, a support element is provided at the corners of, for example, the bottom wall which are adjacent the end wall of the storage case, which support elements serve to insure a snug, reinforcing fit at the end wall when the case is closed so as to prevent the creation of an undesired gap therein.

OBJECTS OF THE INVENTION

Therefore, it is an object of the present invention to provide an improved storage case which is readily adapted to store a cassette therein, and which is provided with at least one hub engaging member of improved, simplified construction for locking a reel within the cassette against rotation.

Another object of this invention is to provide an improved storage case formed of unitary construction having improved hinge elements.

A further object of this invention is to provide a storage case having an improved releasable locking arrangement.

Yet another object of this invention is to provide a storage case of the type having top, bottom and end walls, a peripheral wall extending about one of the top and bottom walls and a skirt extending about the other of the top and bottom walls, wherein support elements are provided to prevent any gap from forming between the end wall and the skirt when the case is closed.

Various other objects, advantages and features of the present invention will become readily apparent from the ensuing detailed description, and the novel features will be particularly pointed out in the appended claims.

SUMMARY OF THE INVENTION

In accordance with the present invention, an improved storage case, adapted to store a cassette, is provided with walls which are closable to form the storage case and at least one hub engaging member mounted on a wall for engaging the hub of a cassette-reel when the cassette is placed into the storage case. The hub engaging member includes a post extending from the wall and having a longitudinal slit therein so as to form two compressible post portions, each portion having a finger projecting outward therefrom. A coil spring is positioned over and guided by the post. A cap having a cylindrical wall, a top wall and an annular shoulder is positioned over the post and spring such that, in assembling the cap to the post, the annular shoulder of the cap compresses the post portions to permit the fingers to pass therethrough and then to expand and lockingly engage the annular shoulder. The cap is biased in the upward direction by the coil spring; and means are provided on the top wall of the cap to engage the hub and thus prevent rotation thereof.

In accordance with another aspect of the present invention, improved hinge members are provided to facilitate the opening and closing of the storage case, which is of unitary construction, without loss of reinforcement. In accordance with yet another aspect of this invention, a releasable locking arrangement is provided, including a rectangular assembly mounted on, for example, the skirt which is provided on one of the top and bottom walls of the case, the rectangular assembly having slits therein to permit a wall of the assembly to flex, this wall having a projection which is insertable into an aperture provided in a recess on the peripheral wall, which recess is in alignment with the rectangular assembly. In accordance with a still further aspect of this invention, a support element is provided at each corner of, for example, the peripheral wall adjacent the end wall, each support element being adapted to contact the skirt while the case is being closed so as to guide the skirt to fit properly about the peripheral wall, to exert an outward force on the skirt to prevent a gap from forming, and to reinforce the end wall when the case is closed.

BRIEF DESCRIPTION OF THE DRAWINGS

The following detailed description, given by way of example, will best be understood in conjunction with the accompanying drawings in which:

FIG. 4 is an exploded perspective view of the hub engaging member of this invention;

FIG. 5 is a sectional view of the hub engaging member in accordance with this invention;

FIG. 6 is a bottom plan view of a cassette which is adapted to be stored in the storage case of this invention;

FIG. 7 is a sectional view of a cassette stored in the storage case of this invention;

DETAILED DESCRIPTION OF THE PREFERRED EMBODIMENTS

Figure 1:
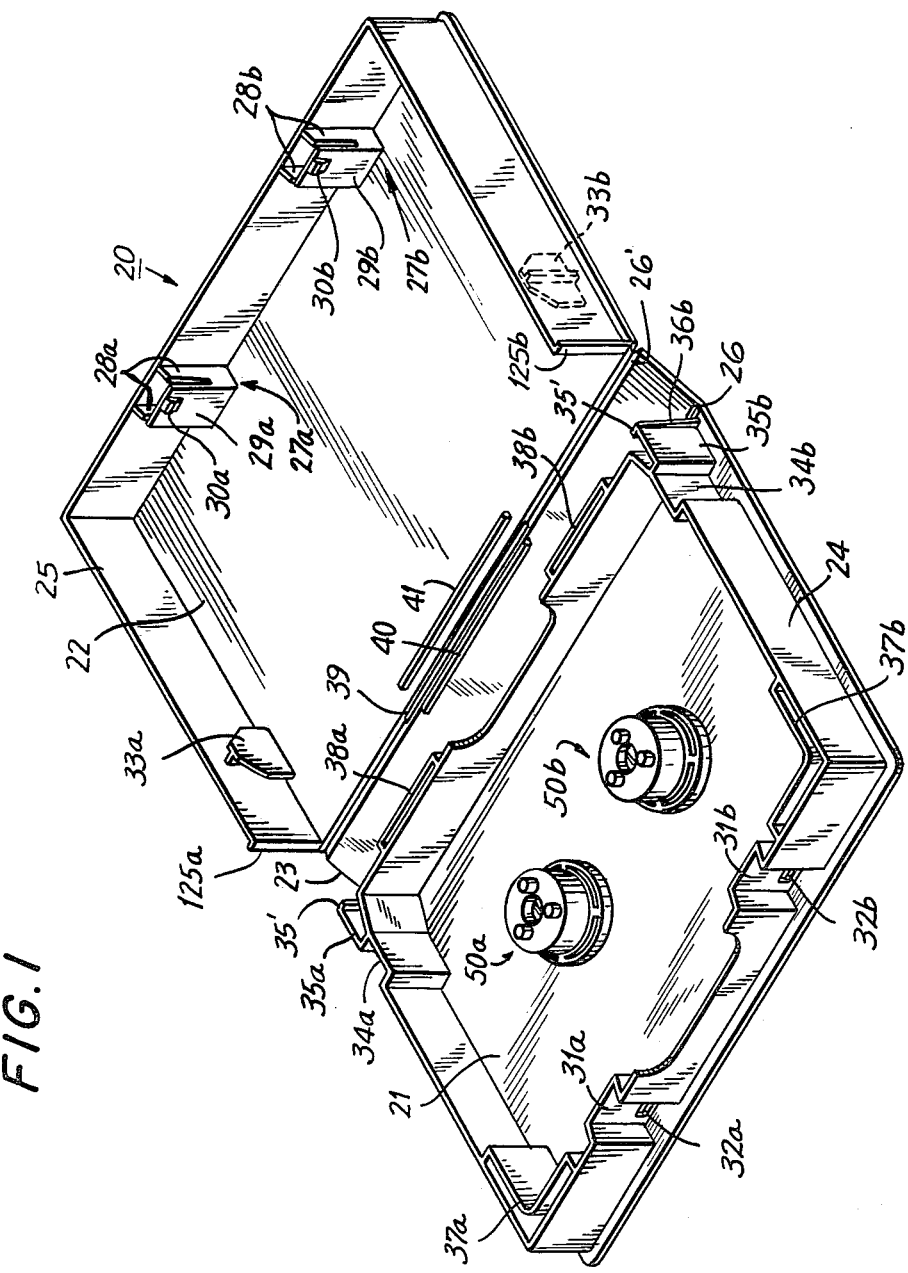
FIG. 1 is a perspective view of the storage case in accordance with the present invention, as shown in the opened position.
Figure 2:
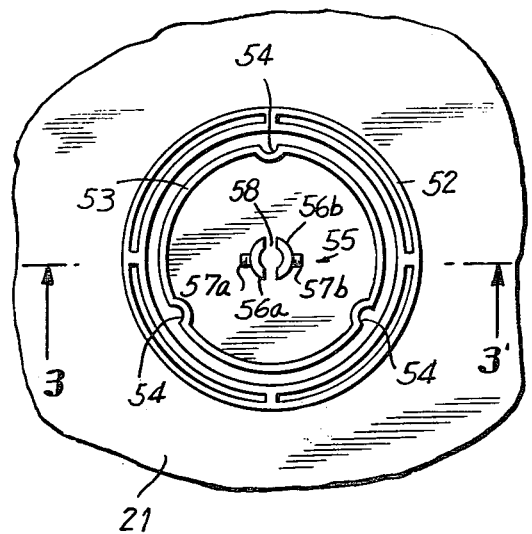
FIG. 2 is a top view of a portion of the hub engaging member in accordance with this invention.

Referring now to the drawings, wherein like reference numerals are used throughout, FIG. 1 is a perspective view of one embodiment of the storage case in accordance with the present invention, as shown in its opened position. Storage case 20 is of unitary construction and is comprised of a bottom wall 21, a top wall 22 and an end wall 23 hingedly connected to bottom wall 21 by a hinge 26, and hingedly connected to the top wall by a hinge 26'. Storage case 20 is formed in a convenient manner from a one piece plastic member. Hinges 26 and 26', as will be explained below, are of reduced thickness relative to the thickness of the bottom, top and end walls, and may be formed by scoring the one piece plastic member. Preferably, the juncture defined by the bottom and end walls, as well as the juncture defined by the top and end walls, is bevelled so as to form the areas of reduced thickness which constitutes hinges 26 and 26'. The juncture edges are at an angle of, for example, 45°.

Bottom wall 21 is provided with an upstanding peripheral wall 24 which, as shown, is a closed wall extending peripherally about the bottom wall so as to define the interior of storage case 20. Peripheral wall 24 is set back from the boundary of bottom wall 21 so as to form a lip along the outer boundary of the bottom wall. A skirt 25 extends upwardly from top wall 22, when case 20 is in its opened position. In the illustrated example, skirt 25 is not closed; and terminates in flanges 125a and 125b adjacent hinge 26'. Flanges 125a and 125b abut against end wall 23 when case 20 is closed, and also serve to reinforce the end wall at its opposite end zones.

Case 20 is provided with releasable locking arrangements 27a and 27b, each being comprised of a rectangular assembly formed of a first wall constituted by a portion of skirt 25, a pair of side walls 28a and 28b extending inwardly of skirt 25, and a second wall 29a and 29b secured to the pair of side walls. As shown in greater detail in FIG. 13, each of the pair of side walls 28a and each of the pair of side walls 28b is provided with a slit which permits wall 29a and wall 29b to flex relative to skirt 25. When a compressional force is exerted on, for example, wall 29a, it flexes or bends in the direction toward the front of the storage case. For the purpose of the present discussion, it will be assumed that end wall 23 defines the rear or back of the storage case, and the front of the storage case is opposite thereto. Thus, when in its closed position, rectangular assemblies 27a and 27b are disposed at the front of storage case 20. With this definition of the front and rear portions of the storage case, it is seen that the front portion of peripheral wall 25 is provided with a pair of recesses 31a and 31b which are aligned with rectangular assemblies 27a and 27b, respectively. Apertures 32a and 32b are provided at the lower portions of recesses 31a and 31b, respectively. These apertures are adapted to receive projections 30a and 30b which extend from walls 29a and 29b of rectangular assemblies 27a and 27b, respectively. The insertion of these projections into apertures 32a and 32b is described in greater detail below with respect to FIGS. 13 and 14. Suffice it to say that recesses 31a and 31b are dimensioned such that when case 20 is in the process of being closed, a force is exerted upon projections 30a and 30b to flex walls 29a and 29b in the forward direction until these projections are inserted into apertures 32a and 32b. At that time, walls 29a and 29b are restored to their quiescent positions, whereby top wall 22 is releasably locked in the closed position.

A pair of guide elements 33a and 33b extend inwardly from the interior surface of the side portions of skirt 25. Each of these guide elements includes a cam surface which aids in guiding the guide elements into pockets, or recesses 34a and 34b, respectively, provided in alignment therewith in the side portions of peripheral wall 24. Guide elements 33a and 33b are in the vicinity of end wall 23 and, similarly, recesses 34a and 34b also are in the vicinity of the end wall. The cooperation between the guide elements and recesses therefor aid in guiding the closure of case 20 such that skirt 25 easily fits about peripheral wall 24.

Figure 8:
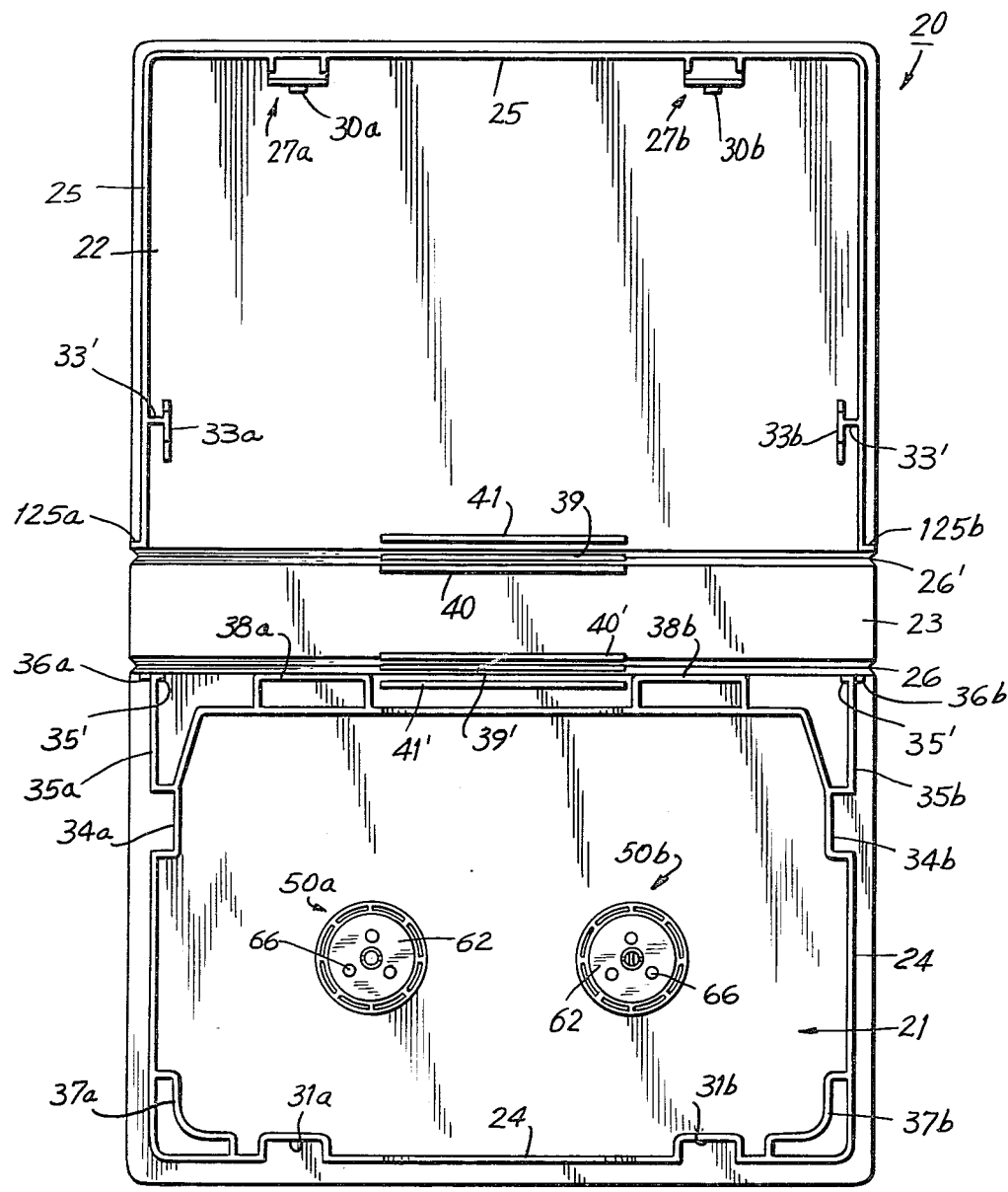
FIG. 8 is a top view of the storage case of this invention.
Figure 16:
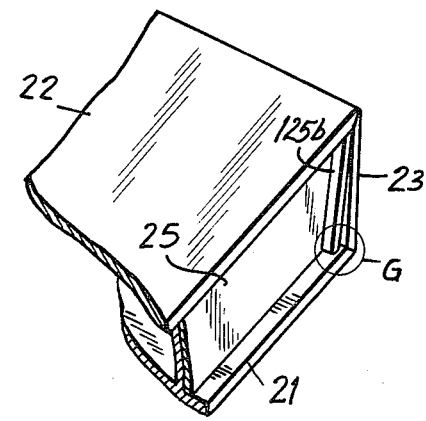
FIG. 16 is a perspective view showing the possibility of the formation of a gap between the end wall and the peripheral skirt which might otherwise be present in the storage case of this invention.

As shown in FIGS. 1 and 8, peripheral wall 24 is provided with reinforcing portions along critical areas thereof. At the rear corners of the peripheral wall, that is, adjacent end wall 23, are provided corner reinforcing walls 35a and 35b. These corner reinforcing walls terminate in flanges 35' which are adapted to abut end wall 23 when case 25 is in its closed position. These flanges thus provide added reinforcement to the rear corners of the storage case. As shown in FIGS. 1 and 16, a pair of support elements (only support element 36b being shown) are provided on each of corner reinforcing walls 35a and 35b. The support element appears as an extension of flanges 35' and extends outwardly of peripheral wall 24. As will be described in greater detail below, the purpose of support element 36b is to guide skirt 25 to fit about the peripheral wall while case 20 is being closed, to exert an outward force on the skirt so as to prevent inward deflection thereof, and to add further reinforcement to end wall 23 when the case is closed. Additional corner reinforcing walls 37a and 37b are provided at the front corners of peripheral wall 24. Still further reinforcing walls 38a and 38b are provided along the rear portion of peripheral wall 24 and abut against end wall 23 when case 20 is in its closed position. Reinforcing walls 38a and 38b resist rear-to-front forces which might otherwise buckle end wall 23 and, additionally, resist the possibility of case 20 being crushed in response to forces exerted between the top and bottom walls thereof.

Figure 9:
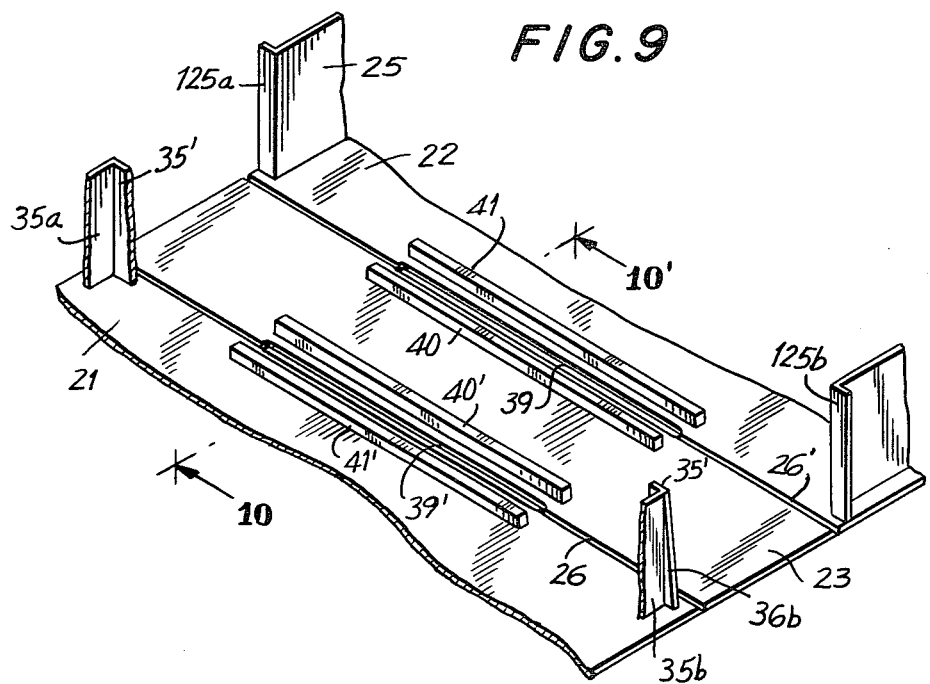
FIG. 9 is a perspective view of the improved hinge elements of this invention.
Figure 10:
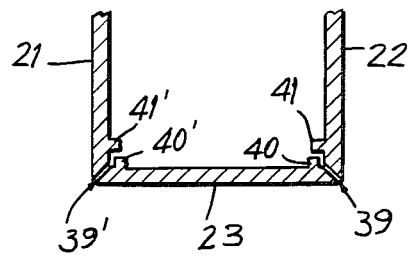
FIG. 10 is a sectional view taken along lines 10—10' of FIG. 9.

In the embodiment shown in FIGS. 1 and 8, and discussed in greater detail below with respect to FIGS. 9 and 10, hinges 26 and 26' are provided with longitudinal slits 39 and 39' which extend completely through the plastic material. Slits 39 and 39' are confined to a predetermined portion at the mid-section of slits 26 and 26'. By providing these slits in hinges 26 and 26', greater flexibility is attained, thereby facilitating the opening and closing of case 20. However, this greater flexibility is achieved at the expense of weakening the hinges, and particularly the junctures between the end and top and bottom walls. This weakening is compensated by a pair of longitudinal ribs 40 and 41 which run parallel to and are disposed on either side of slit 39, and also by a pair of longitudinal ribs 40' and 41' which run parallel to and are disposed on either side of slit 39'. Thus, longitudinal ribs 40 and 40' are provided on end wall 23, and longitudinal ribs 41 and 41' are provided on top wall 22 and bottom wall 21, respectively. Each pair of ribs abuts against each other when case 20 is closed so as to reinforce hinges 26 and 26', even though slits 39 and 39' are formed therein.

A pair of hub engaging members 50a and 50b extend upwardly from bottom wall 21 and are adapted to be inserted in the reel hubs of the cassette which is stored in case 20. The hubs prevent lateral movement of the cassette within the case and, more importantly, prevent the reels from freely rotating. If the cassette is a tape cassette, such as a video tape cassette, it is important that tape which is stored therein be prevented from unwinding and possibly spilling out from the cassette housing. This is attained when hub engaging members 50a and 50b lock the tape supply and take-up reels in the cassette from rotating.

Figure 3:
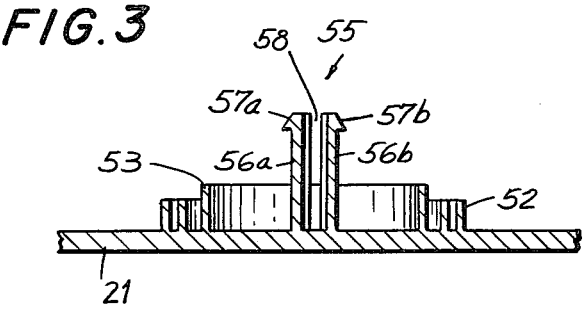
FIG. 3 is a sectional view taken along lines 3—3' of FIG. 3.

The various features included in case 20, and mentioned hereinabove, now will be described in greater detail. Reference first is made to the construction of hub engaging members 50a and 50b. As shown in FIGS. 2-5, each hub engaging member 50 is comprised of a base portion secured to bottom wall 21 by any convenient technique, a guide post 55 extending upward from the central area of the base portion, and a cap 60 which is positioned over guide post 55 into engagement with the base. The base is comprised of an outer annular member 52 which circumscribes an inner ring member 53, the latter being provided with a plurality of keyways 54, for example, three keyways. Guide post 55 is provided with a longitudinal slit 58 so as to form two equal portions 56a and 56b, each portion having a finger 57a, 57b extending therefrom. Slit 58 permits portions 56a and 56b to be compressed toward each other in response to a suitable force exerted on guide post 55. Each finger, as shown in FIG. 3, has an inclined, or cammed upper surface, for a purpose soon to be described.

A coil spring 59 is supported upon and guided by guide post 55, as shown in FIG. 5. This spring functions to exert an upward bias force on cap 60 when the cap is in its assembled position.

As shown in FIGS. 4 and 5, cap 60 is comprised of a cylindrical wall 61, a top wall 62 and a central recess 63 provided in the top wall. The bottom portion of central recess 63 terminates in an annular shoulder 64. A plurality of ribs 65, extending in the axial direction of cylindrical wall 61, are provided on the interior surface of this cylindrical wall. These ribs are adapted to mate with keyways 54, thereby preventing cap 66 from rotating. A plurality of engaging protuberances 60, such as nubs, extend upwardly from top surface 62 of cap 60. These engaging protuberances are adapted to be inserted into drive holes which normally are provided in the hub of each reel in a standard cassette (e.g. a standard video cassette). One of the protuberances on a portion of top surface 62 which is cutaway in FIG. 4 is shown in phantom and identified by reference numeral 66a.

In assembling the hub engaging member, coil spring 59 is positioned about guide post 55, and then cap 60 is placed over the guide post. As shown in FIG. 5, the diameter of spring 59 is greater than the central opening in annular shoulder 64. Hence, when cap 60 is assembled, spring 59 is compressed. Ribs 65 are aligned with keyways 54, and then a final downward force is exerted on the cap. As the cap is pressed down, the annular shoulder is forced against fingers 57a and 57b. The inclined surfaces of these fingers convert the downward force exerted by the annular shoulder into a compressing force, whereby the fingers are urged toward each other. When the fingers are compressed, guide post 55 is further inserted through the interior aperture of annular shoulder 64 and into recess 63. Once fingers 57a and 57b clear the annular shoulder, the compressional force exerted on the two portions of the guide post is removed therefrom, and the fingers return to their quiescent positions. As shown in FIG. 5, the fingers now are seated upon annular shoulder 64 and limit the upward displacement of cap 60, which upward displacement is caused by the bias force exerted on the cap by spring 59.

For removal thereof, an axial force merely is exerted on cap 60 to depress the latter whereupon guide post portions 56a and 56b are urged toward each other so as to release fingers 57a and 57b from annular shoulder 64. This frees cap 60 for removal.

The manner in which hub engaging members 50a and 50b are received by the hubs of the supply and take-up reels in a stored cassette is shown in FIG. 7. Let it be assumed that the cassette which is stored in case 20 is a video cassette of the type shown in FIG. 6. FIG. 6 is a bottom plan view of cassette 70 which is comprised of a bottom wall 71 having a pair of apertures therein through which, when the cassette is used in a VTR, are inserted respective hub-driving members. Each hub includes a cylindrical wall 74, 75 terminating in a top wall 72, 73. A plurality of drive-holes 77 are formed in each top wall 72, 73. Tape 76 is driven from one to the other of the illustrated reels.

When a cassette of the type shown in FIG. 6 is inserted into case 20, hub engaging members 50a and 50b are inserted into the cylindrical openings defined by cylindrical walls 74 and 75 of the tape reels. If protuberances 66 on the top surface 62 of cap 60 are not aligned with drive holes 77, cap 60 is depressed by reason of the force exerted on these protuberances by top walls 72 and 73 of the cassette hub. When top wall 22 is closed over bottom wall 21, the cassette is confined in the closed case and, moreover, the reels, such as reels 70 and 79, are forced against the top wall of the cassette. Friction between this top wall and the reels generally minimizes any undesired rotation of such reels. However, even if the reels rotate because of various forces exerted on the stored cassette, as during the handling thereof, drive holes 77 rapidly will be aligned with protuberances 60. At that time, these protuberances are inserted into the drive holes by reason of the upward force exerted on cap 60 by compressed spring 59. Further rotation of reels 78 and 79 is prevented because cap 60 cannot rotate. Thus, cassette 70 is stored within storage case 20 in the absence of any undesired rotation of the cassette reels and concomitant spilling of tape wound thereon.

Reference now is made to the improved hinges which are provided in case 20. One embodiment of such improved hinges is shown in FIGS. 9 and 10. As mentioned above, bottom wall 21, top wall 22 and end wall 23 are formed of one-piece plastic. Hinges 26 and 26' are provided by scoring the junctures between the end and each of the top and bottom walls. In order to make these hinges more flexible, slits 39 and 39' are provided in the mid-section of each hinge. Each slit extends completely through the plastic material. In the absence of such slits, hinges 26 and 26' would be too rigid for the satisfactory automatic insertion of a cassette into storage case 20. That is, because of the rigidity of the hinges, the case would not be completely opened. Top wall 22 thus could interfere with the cassette during its insertion into the case. Also, with relatively rigid hinges, it would be difficult to maintain the case in its closed position. That is, the locking means which would be necessary to overcome the tendency of the case to open would hinder the locking and unlocking operations, thus making it difficult for a user to use this case.

Although slits 39 and 39' overcome the aforementioned difficulties, the fact that these slits extend completely through the plastic material results in weakening the case in the vicinity of such slits. To compensate for such weakening, longitudinal ribs 40, 41 and 40', 41' are disposed in respective pairs, each pair effectively straddling a corresponding slit. Thus, when case 20 is closed, as depicted in FIG. 10, ribs 40 and 41 tend to reinforce hinge 26', particularly in the vicinity of slit 39; and ribs 40' and 41' tend to reinforce hinge 26, particularly in the vicinity of slit 39'. Although the respective ribs of each pair normally are spaced from each other by a small amount when case 20 is closed, they tend to reinforce end wall 23 by coming into contact with each other in the event that a compressional force is exerted on the end wall. This resists the possibility of crushing case 20 by reason of such a force.

Preferably, each of hinges 26 and 26' is formed of bevelled edges at the mating portions of the end and bottom walls and at the mating portions of the end and top walls. The bevelled faces which form the hinges are at an angle of about 45° relative to the respective walls. With this angle, the two bevelled faces which constitute a hinge can be brought into smooth, mating relation when case 20 is closed, as shown in FIG. 10.

Figure 11:
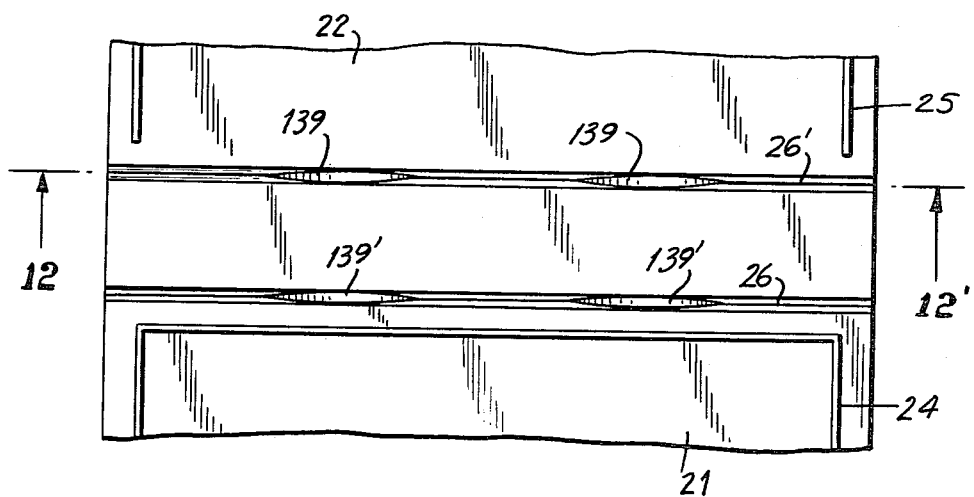
FIG. 11 is a top view of another embodiment of the hinge members of this invention.
Figure 12:
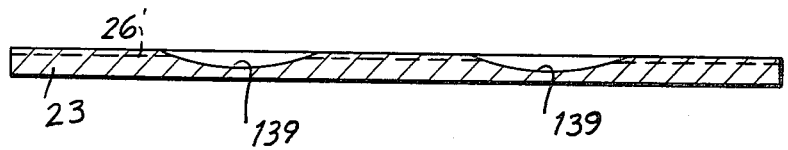
FIG. 12 is a sectional view taken along lines 12—12' of FIG. 11.

An alternative embodiment of hinges 26 and 26' is illustrated in FIGS. 11 and 12. Each hinge again is formed of bevelled edges in the manner discussed previously. However, the embodiment illustrated herein differs from the embodiment shown in FIG. 9 in that, rather than providing slits 39 and 39', valleys 139 and 139' are provided in each hinge. In the example illustrated herein, each hinge is provided with two such valleys. As best shown in the sectional view of FIG. 12, each valley 139 has a deeper portion at its mid-section, the valley becoming gradually more shallow in the longitudinal direction extending away from the mid-section. Since valleys 139, 139' do not extend completely through the plastic material, there is no need for reinforcing ribs, as in the FIG. 9 embodiment. Nevertheless, since the valleys thus increase the depth of hinges 26, 26' at discrete locations, the flexibility of these hinges is improved, thereby facilitating the opening and closing of case 20.

Figure 13:
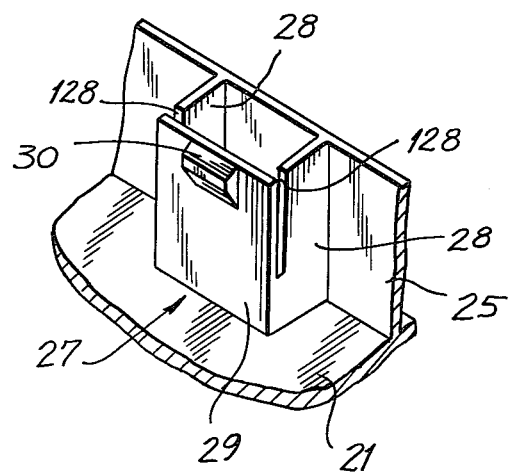
FIG. 13 is a perspective view of the releasable locking arrangement of this invention.
Figure 14:
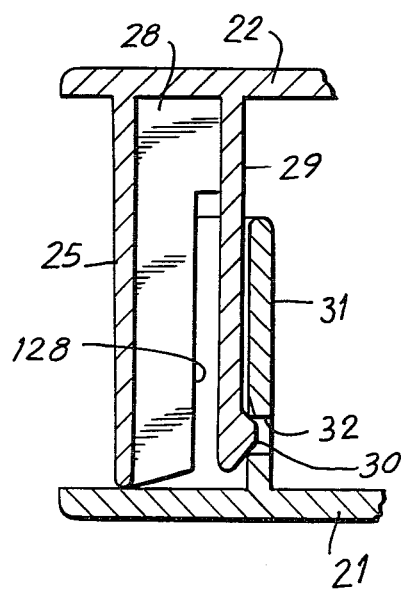
FIG. 14 is a sectional view showing the releasable locking arrangement in its locked condition.

An embodiment of the releasable locking arrangement is illustrated in FIGS. 13 and 14. Since both locking arrangements are of identical construction, the following description is equally applicable to both. The locking arrangement is comprised of rectangular assembly 27 which is secured to the front portion of skirt 25. As mentioned above, one wall of this rectangular assembly is formed of a portion of the skirt itself, and a pair of side walls 28 extend inwardly from the skirt. Another wall 29 is secured to each of side walls 28, and a slit 128 is provided between wall 29 and each of the side walls. As illustrated, each slit 128 extends partially the height of the side walls. Although the slit is shown at the juncture between wall 29 and side walls 28, it should be appreciated that, if desired, slit 128 may be formed at any location in the side walls intermediate skirt 25 and wall 29. However, it is believed that optimum flexibility is attained if this slit is positioned where illustrated.

As illustrated in FIG. 1, each of recesses 31a and 31b is adapted to receive a corresponding rectangular assembly 27a, 27b. FIG. 14 illustrates that, when case 20 is closed, projection 30 is inserted into aperture 32 of recess 31. Normally, while top wall 22 and bottom wall 21 are moved toward each other, projection 30 first engages the wall of recess 31. By reason of the dimensioning of the rectangular assembly and the recess, this engagement between projection 30 and recess 31 exerts a force against wall 29; and by reason of slits 128, this wall is permitted to flex in the forward direction (i.e., toward the front of case 20). Then, when case 20 is fully closed, projection 30 reaches aperture 32, and the resiliency of wall 29 thus inserts the projection into this aperture. Hence, case 20 is locked in its closed position. By reason of the inclined surfaces on projection 30, case 20 may be readily unlocked merely by exerting a separating force on the top and bottom walls. As top wall 22 moves upward, as viewed in FIG. 14, the inclined surface of projection 30 cams wall 29 in the forward direction so as to release the projection from aperture 32. Hence, the illustrated locking arrangement is unlocked.

In FIGS. 13 and 14, wall 29 is seen to be shorter than the height of skirt 25. Thus, when the free edge of the skirt contacts bottom wall 21, no restraining frictional forces are exerted on wall 29 by reason of a contact between the upper, free end of this wall and the bottom wall 21. This permits wall 29 to be restored to its quiescent position when projection 30 is inserted into aperture 32.

Figure 17:
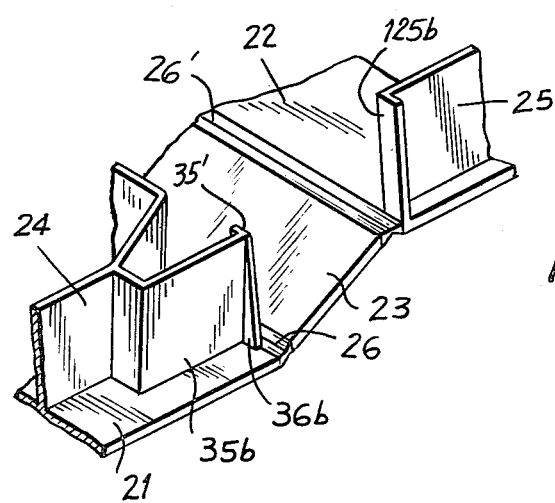
FIG.17 is a perspective view showing the support element which is provided on the peripheral wall to prevent the formation of the gap shown in FIG. 16.

As discussed above with respect to FIG. 1, corner reinforcing wall 35a and 35b on peripheral wall 24 are provided with support elements, only one of which is shown as support element 36b. This support element, shown in greater detail in FIG. 17, appears as a triangular-shaped flange, and together with flange 35′ forms the top of a "T", with corner reinforcing wall 35b forming the leg of the "T". That is, support element 36b extends in the same direction as, and thus is parallel to, flange 125b provided on the terminating portion of skirt 25.

Figure 15:
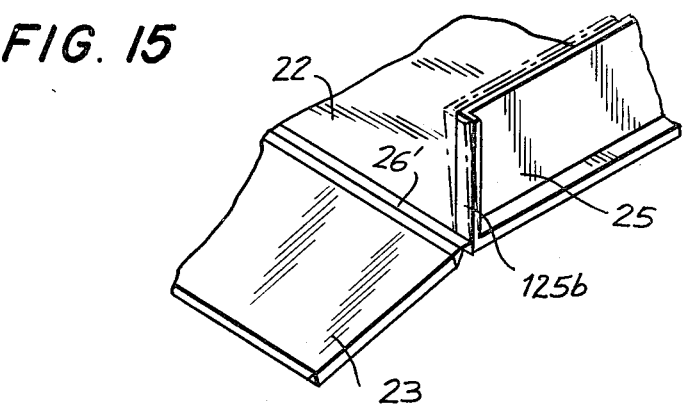
FIG. 15 is a perspective view of the juncture between the end wall and the peripheral skirt of the storage case in accordance with this invention.

The purpose of support element 36b now will be described with reference to FIGS. 15 and 16. In the absence of this support element, skirt 25 could deflect inwardly of case 20, as shown by the broken lines in FIG. 15. This inward deflection would arise because of the inherent resiliency of the plastic material and, moreover, because of the clearance between peripheral wall 24 and skirt 25 to facilitate free opening and closing of the case. Because of this deformation of skirt 25, when the case is in its closed position, as illustrated in FIG. 16, a gap G may be formed between end wall 23 and skirt 25. This gap enables dust and other contaminating particles to enter the closed case and may be deposited upon the tape which is housed in the cassette therewithin. This possible deficiency is avoided by the use of support element 36b.

When case 20 is closed, the inclined edge, or surface, of support element 36b engages skirt 25 and serves to guide top wall 22 into proper position with respect to bottom wall 21, while also guiding skirt 25 to fit properly about peripheral wall 24. Also, support element 36b provides reinforcement at this corner of the case, that is, the corner defined by end wall 23, peripheral wall 24 and skirt 25. Still further, support element 36b exerts an outward force against skirt 25 as the case is being closed. This prevents the skirt from deforming in the manner shown in FIGS. 15 and 16, thereby avoiding the formation of gap G.

While the present invention has been particularly shown and described with reference to certain preferred embodiments, it should be readily apparent to those of ordinary skill in the art that various changes and modifications in form and details may be made without departing from the spirit and scope of the invention. It is, therefore, intended that the appended claims be interpreted as including all of such changes and modifications.

What is claimed is:

1. A storage case, adapted to store a cassette of the type having at least one reel, comprising walls closable to form said storage case; and at least one hub engaging member mounted on one of said walls for engaging the hub of said at least one reel when said cassette is placed into said storage case, said hub engaging member including a post extending from said one wall, said post having a longitudinal slit therein parallel to the longitudinal axis thereof to form two post portions which are compressible toward each other in the diametrical direction across said slit, each of said post portions having a finger projecting outward therefrom adjacent a free end portion of the respective post portion and defining an inclined cam surface, a coil spring positioned over and guided by said post, a cap including a cylindrical side wall, a top wall with a central depression and an annular shoulder extending around an opening in said depression, said cap being positioned over said post and said spring such that, in passing said post through said opening in the central depression for assembling said cap to said post, the annular shoulder of said cap acts on said inclined cam surface of each of the fingers and thereby compresses the post portions to permit the fingers to pass through said opening and then to expand in said depression and lockingly engage said annular shoulder, said coil spring exerting a bias force on said cap in the direction urging said annular shoulder against said fingers, means provided on said top wall of the cap to engage said hub, a ring member projecting axially from said one wall concentrically with respect to said post and being in axially overlapping relation with said cylindrical side wall of the cap when the latter has said annular shoulder urged against said fingers, and cooperatively engageable, axially extending key-way means and rib means on said ring member and side wall, respectively, to prevent rotation of said cap, said cylindrical side wall of the cap having an axial dimension such that its edge is spaced from said one wall when said annular shoulder engages said fingers.

2. The storage case of claim 1 wherein said longitudinal slit diametrically divides said post into two equal portions.

3. The storage case of claim 1 wherein one end of said coil spring abuts one said wall and the other end of said coil spring abuts said annular shoulder to bias said cap away from said one wall.

4. The storage case of claim 1 wherein said hub of said reel is provided with apertures for receiving rotatable drive means; and wherein said means provided on the top wall of said cap to engage said hub comprises at least one projection to be inserted into an aperture provided on said hub.

5. A storage case comprising a top wall; a bottom wall; an end wall hingedly connected to each of said top and bottom walls; a peripheral wall extending from one of said top and bottom walls in the upward direction when said storage case is opened; a peripheral skirt extending from the other of said top and bottom walls in the upward direction when said storage case is opened; at least one releasable locking means on said skirt including a substantially rectangular assembly having a first wall formed by said skirt, a pair of opposite side walls, a second wall secured to said side walls, a pair of slits provided in said pair of side walls, respectively, to enable said second wall to flex in response to a force exerted thereon, and a projection extending outwardly from said second wall; at least one recess in said peripheral wall for receiving said rectangular assembly and dimensioned to exert a force sufficient to flex said second wall when said storage case is closed; and an aperture in said recess for receiving said projection extending from said second wall when said storage case is closed so as to releasably lock said storage case in its closed position.

6. The storage case of claim 5 further comprising a second releasable locking means substantially the same as said at least one releasable locking means on said skirt; and a second recess substantially the same as said at least one recess in said peripheral wall, said second recess having an aperture for receiving the projection of said second releasable locking means.

7. The storage case of claim 6 wherein said releasable locking means are provided along that portion of said skirt remote from said end wall; and wherein said recesses are provided along that portion of said peripheral wall remote from said end wall.

8. The storage case of claim 5 wherein said top, bottom and end walls are of unitary construction and wherein the junctions between said end wall and each of said top and bottom walls are scored; further comprising a respective slit through a portion of each scored junction between said end wall and said top and bottom walls to form a flexible hinge, and a respective pair of longitudinal ribs running parallel to and on either side of a respective slit to add reinforcement to said flexible hinge when said case is closed.

9. The storage case of claim 5 wherein said top, bottom and end walls are of unitary construction and wherein the junctions between said end wall and each of said top and bottom walls are scored; further comprising at least one recess in each scored junction, said recess having a deeper portion thereof in the vicinity of its mid-section and gradually shallower portions extending in opposite directions from said deeper portion.

10. The storage case of claim 9 in which a plurality of recesses, each having a deeper portion thereof in the vicinity of its mid-section and gradually shallower portions extending in opposite directions from said deeper portion, is provided in each scored junction.

11. The storage case of claim 5, 8 or 9 further comprising a corner reinforcing wall secured to said peripheral wall in the vicinity of each corner thereof adjacent said end wall; and a support element on each corner reinforcing wall having a surface facing said skirt when said case is closed, said support element exerting an outward force on said skirt to prevent said skirt from deflecting inwardly of said case.

12. The storage case of claim 11 wherein said support element has a cam surface to engage and guide said skirt as said case is closed.

13. The storage case of claim 12 wherein said support element is positioned to engage said end wall to reinforce said end wall when said case is closed.

14. A storage case comprising a top wall; a bottom wall; an end wall interconnected between said top and bottom walls; said top, bottom, and end walls being of unitary construction; the junctions formed by the interconnection of said end wall to each of said top and bottom walls being bevelled to facilitate the closing of said case; each of said bevelled junctions having a respective slit completely through a longitudinal portion thereof to form a flexible hinge; and a respective pair of longitudinal ribs running parallel to and on either side of each said respective slit to contact one another under a compressive load when said case is closed and assist said end wall and said top and bottom walls in supporting one another.

15. A storage case comprising a top wall; a bottom wall; an end wall interconnected between said top and bottom walls; said top, bottom and end walls being of unitary construction; the junctions formed by the interconnections of said end wall to each of said top and bottom walls being bevelled to facilitate the closing of said case; and a plurality of longitudinally extending recesses in each bevelled junction, each recess having a deeper portion thereof in the vicinity of its mid-section and gradually shallower portions extending in opposite longitudinal directions from said deeper portion.

16. The storage case of claim 15 further comprising a peripheral wall extending upward from said bottom wall when said case is opened; a peripheral skirt extending upward from said top wall when said case is opened; a corner reinforcing wall secured to said peripheral wall in the vicinity of each corner thereof adjacent said end wall; and a support element on each corner reinforcing wall having a cam surface to contact said skirt while said case is being closed so as to guide said skirt to fit about said peripheral wall, to exert an outward force on said skirt to prevent same from deflecting inwardly of said case, and to reinforce said end wall when said case is closed.

17. A storage case comprising a top wall; a bottom wall; an end wall interconnected between said top and bottom walls; said top, bottom, and end walls being of unitary construction; the junctions formed by the interconnection of said end wall to each of said top and bottom walls being bevelled to facilitate the closing of said case; each of said bevelled junctions having a respective slit completely through a longitudinal portion thereof to form a flexible hinge; a respective pair of longitudinal ribs running parallel to and on either side of each said respective slit to reinforce said flexible hinge when said case is closed; a peripheral wall extending upward from said bottom wall when said case is opened; a peripheral skirt extending upward from said top wall when said case is opened; a corner reinforcing wall secured to said peripheral wall in the vicinity of each corner thereof adjacent said end wall; and a support element on each corner reinforcing wall having a cam surface to contact said skirt while said case is being closed so as to guide said skirt to fit about said peripheral wall to exert an outward force on said skirt to prevent the latter from deflecting inwardly of said case and to reinforce said end wall when said case is closed.

* * * * *